United States Patent
Kuji et al.

(10) Patent No.: US 7,900,442 B2
(45) Date of Patent: Mar. 8, 2011

(54) ENGINE INCLUDING SECONDARY AIR SUPPLY APPARATUS

(75) Inventors: Yasuhiro Kuji, Kako-gun (JP); Yuichi Kawamoto, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 608 days.

(21) Appl. No.: 12/003,361

(22) Filed: Dec. 21, 2007

(65) Prior Publication Data

US 2008/0178584 A1 Jul. 31, 2008

(30) Foreign Application Priority Data

Dec. 27, 2006 (JP) .............................. P2006-351373

(51) Int. Cl.
*F01N 3/00* (2006.01)
(52) U.S. Cl. ................ 60/289; 60/293; 60/304; 60/305; 60/307; 60/317
(58) Field of Classification Search .................... 60/289, 60/293, 304, 305, 306, 307, 317, 323
See application file for complete search history.

(56) References Cited

U.S. PATENT DOCUMENTS

| 4,133,175 | A | * | 1/1979 | Katoh | 60/293 |
| 4,387,565 | A | * | 6/1983 | Otani et al. | 60/293 |
| 4,437,305 | A | * | 3/1984 | Ikenoya et al. | 60/293 |
| 4,727,717 | A | * | 3/1988 | Ikenoya et al. | 60/293 |
| 6,311,483 | B1 | * | 11/2001 | Hori et al. | 60/293 |

FOREIGN PATENT DOCUMENTS

| JP | 55-151114 | 11/1980 |
| JP | 2000-328933 | 11/2000 |
| JP | 2003-074319 | 3/2003 |

* cited by examiner

*Primary Examiner* — Binh Q. Tran
(74) *Attorney, Agent, or Firm* — Wenderoth, Lind & Ponack, L.L.P.

(57) ABSTRACT

The present invention provides an engine including a secondary air supply apparatus for supplying a secondary air to an exhaust gas passage in a cylinder head. The engine comprises a secondary air passage of the secondary air supply apparatus which extends from an outer peripheral surface of the cylinder head through an under-portion of the exhaust gas passage into the exhaust gas passage. The secondary air passage has a groove geometry of passage portion on a matching surface between the cylinder head and a cylinder body.

4 Claims, 10 Drawing Sheets

PRIOR ART

Fig. 10

PRIOR ART

Fig. 11

PRIOR ART

ENGINE INCLUDING SECONDARY AIR SUPPLY APPARATUS

BACKGROUND OF THE INVENTION

1. Field of the Invention

The present invention relates to an engine including a secondary air supply apparatus for supplying secondary air to an exhaust gas passage in a cylinder head.

2. Description of the Related Art

Figure 9:
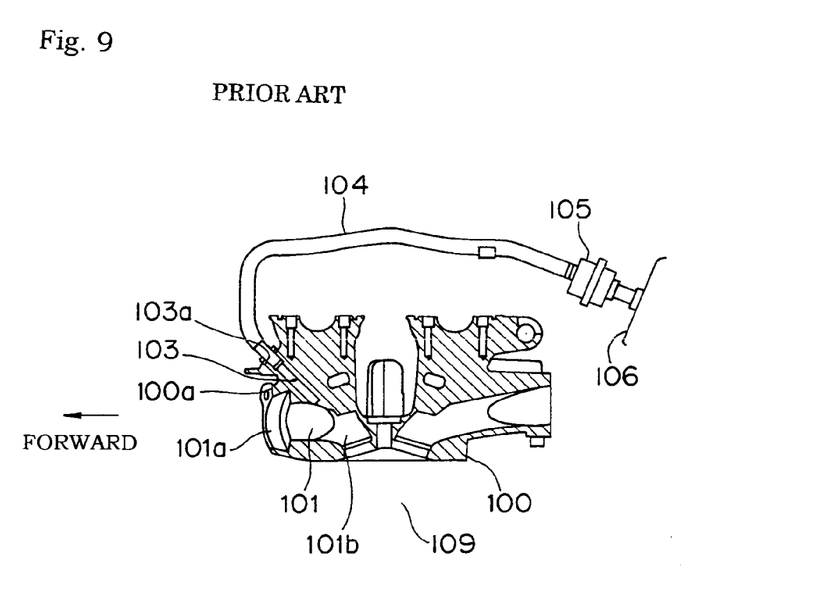
FIG. 9 is a longitudinal sectional view showing a cylinder head of a first conventional example.
Figure 10:
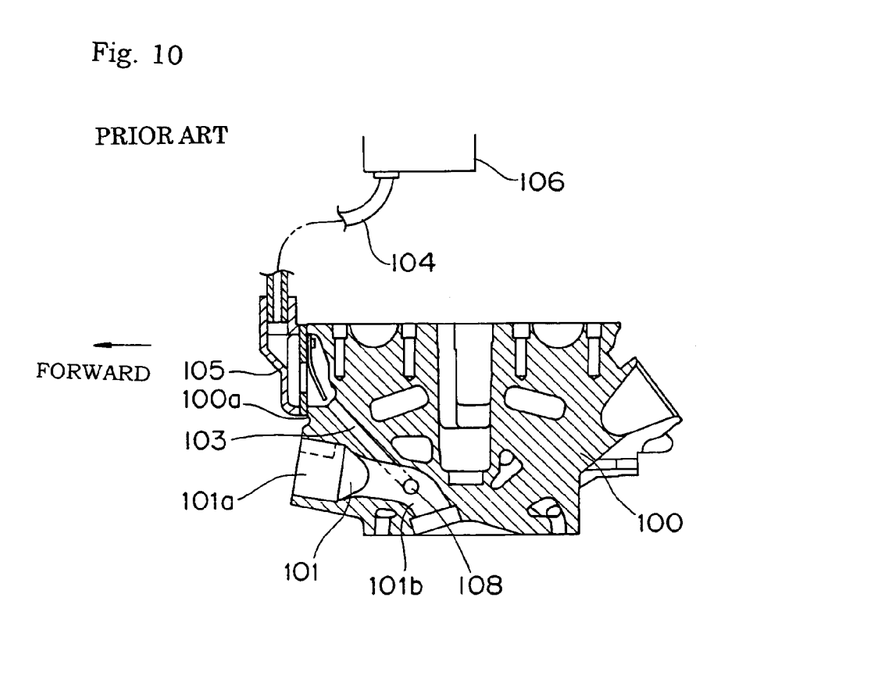
FIG. 10 is a longitudinal sectional view showing a cylinder head of a second conventional example.
Figure 11:
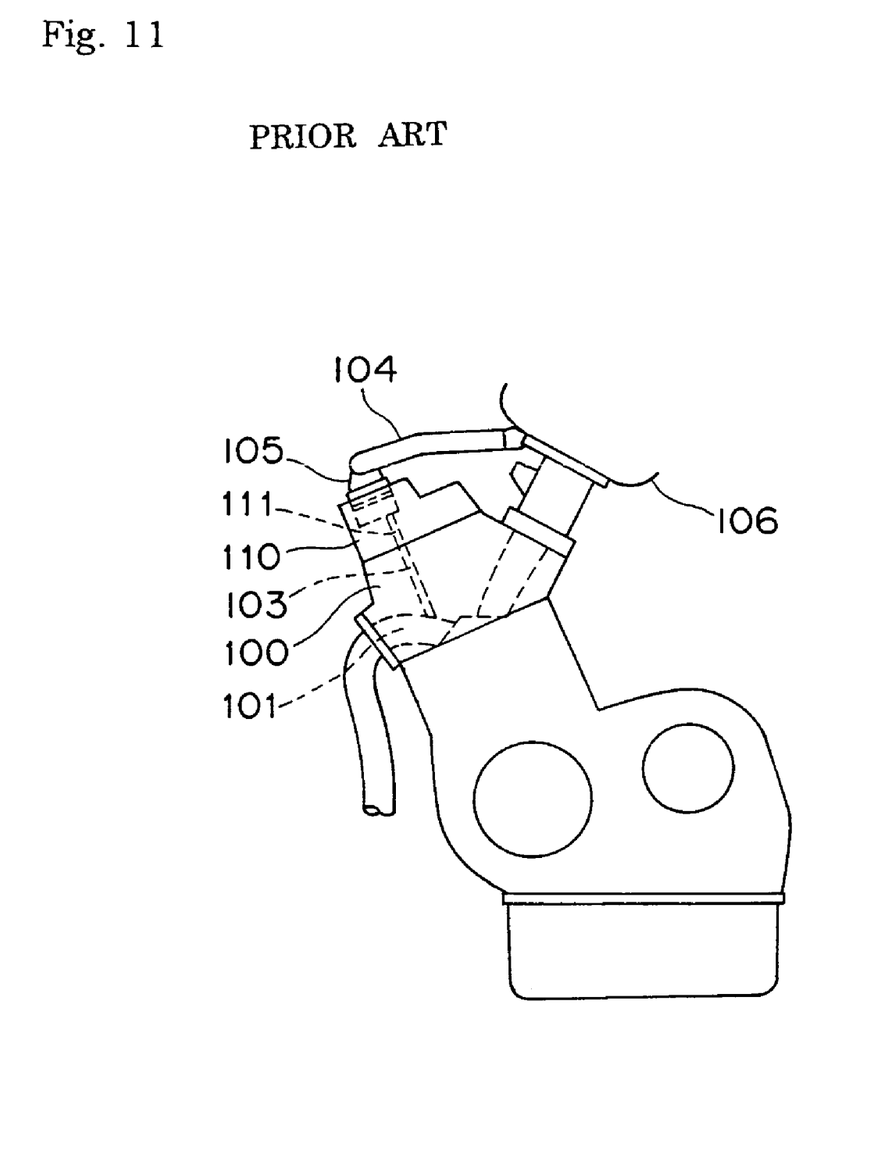
FIG. 11 is a left side view showing an engine of a third conventional example.

As shown in the first to the third conventional examples of FIGS. 9 to 11, in an engine including a secondary air supply apparatus, usually secondary air is taken from an air cleaner, and the secondary air is supplied to an exhaust gas passage through secondary air passages having various configurations.

In the first conventional example shown in FIG. 9, a linearly drill hole is made as a secondary air passage 103 above an exhaust gas passage 101 in a cylinder head 100, and an inlet 103a of the secondary air passage 103 is opened at an upper portion on an outer peripheral surface 100a of the cylinder head 100 on to which an exhaust gas outlet 101a of the exhaust gas passage 101 is opened. A secondary air pipe 104 is connected to the inlet 103a. The secondary air pipe 104 is extended toward an air cleaner 106 provided on the opposite side of the exhaust gas outlet, and the secondary air pipe 104 is connected to the air cleaner 106 through a secondary air lead valve 105. Assuming that the side of the outer peripheral surface 101a of the cylinder head 100 is set to "forward" as shown by an arrow, the secondary air passage 103 is rear downwardly extended from the inlet 103a to an outlet opened at an upper part of the exhaust gas passage 101 such that the secondary air passage 103 is in communication with the exhaust gas passage 101. For example, the first conventional engine has a four-valve structure including a pair of intake valves and a pair of exhaust valves in one cylinder, an exhaust upstream portion of the exhaust gas passage 101 is branched into two by a partition 101b, and the secondary air passage 103 is in communication from above with an exhaust downstream portion where the two branch exhaust gas passages are merged in the exhaust gas passage 101.

In the second conventional example shown in FIG. 10, the secondary air lead valve 105 is attached to the outer peripheral surface 100a of the cylinder head 100 on which the exhaust gas outlet 101a of the exhaust gas passage 101 is opened. In FIG. 10, the same component as that of FIG. 9 is designated by the same numeral or number. The secondary air lead valve 105 is disposed above the exhaust gas outlet 101a. The secondary air passage 103 is rear downwardly extended in the cylinder head 100 from the lead valve 105, the secondary air passage 103 reaches the partition 101b of the exhaust gas passage 101, and is in communication with each branch exhaust gas passage on both sides of the partition 101b through a lateral passage portion 108.

In the third conventional example shown in FIG. 11 is disclosed in Japanese Unexamined Patent Application Publication No. 2003-74319, the lead valve 105 is attached to an upper end of a head cover 110 fastened to an upper end of the cylinder head 100. In FIG. 11, the same components as that of FIG. 9 are designated by the same numerals. Secondary air passages 111 and 103 are formed in the head cover 110 and the cylinder head 100 respectively, and the secondary air passages 111 and 103 are in communication with the upper part of the exhaust gas passage 101.

In the first conventional example shown in FIG. 9, when the secondary air passage 103 is drilled in the cylinder head 100, it is required to make a long stroke hole from the inlet 103a to the exhaust gas passage 101 using a long and thin drill. This hole making work becomes troublesome, because the hole making work should be performed such that the drill is not broken and such that the drill is not bent during the work. Further, given that re-burning of unburned gas is promoted by supplying the secondary air to a high-temperature point near a combustion chamber 109 of the engine, preferably the outlet of the secondary air passage 103 is disposed near the combustion chamber 109. However, when the outlet of the secondary air passage 103 is brought close to the combustion chamber 109, the secondary air passage 103 is lengthened, which makes the hole making work of the secondary air passage 103 with the drill more difficult. Further, since the secondary air passage 103 is formed above the exhaust gas passage 101 and the secondary air pipe 104 is passed through an upside of the engine from the inlet 103a and connected to the air cleaner 106, a height of the engine is increased in the structure.

In the structure of the second conventional example shown in FIG. 10, similarly to the first conventional example, it is necessary that the hole making work of the secondary air passage 103 be performed for a long stroke using a long and thin drill, so that a large amount of time is taken in forming the secondary air passage 103. Furthermore, the size in the forward and rearward direction of the engine and the height of the engine are increased because the secondary air lead valve 105 is disposed above the exhaust gas outlet 101a while attached to the outer peripheral surface (front wall surface) 100a of the cylinder head 100.

In the third conventional example shown in FIG. 11, the hole making work becomes troublesome because it is necessary to form the secondary air passages 103 and 111 in both the cylinder head 100 and the head cover 110. Additionally, the total height of the engine is increased because the secondary air lead valve 105 is attached to the upper end of the head cover 110.

SUMMARY OF THE INVENTION

The present invention addresses the above described condition, and an object of the present invention is to provide an engine including a secondary air supply apparatus, in which a secondary air passage located in a cylinder head can be easily formed and can be in communication with a exhaust gas passage at a neighborhood of a combustion chamber of the engine while compact engine is maintained.

In order to accomplish the foregoing object of the present invention, there is in accordance with the present invention provided an engine including a secondary air supply apparatus for supplying secondary air into an exhaust gas passage in a cylinder head, the engine including a secondary air passage of the secondary air supply apparatus which extends from an outer peripheral surface of the cylinder head through an under-portion of the exhaust gas passage into the exhaust gas passage, the secondary air passage having a groove geometry of a passage portion on a matching surface between the cylinder head and a cylinder body.

With this configuration, since the secondary air passage has the groove geometry of the passage portion formed in a groove shape on a matching surface between the cylinder head and the cylinder body, the secondary air passage can be easily formed. That is, the groove geometry of the passage portion can be molded easily during the casting of the cylinder head.

Additionally, the groove geometry of the passage portion shortens a portion of the secondary air passage formed by the drill (drill hole). Therefore, breaking or bending of the drill can be effectively prevented.

Since the geometry of the passage portion of the secondary air passage is formed on the matching surface between the cylinder head and the cylinder body, the secondary air passage can be formed in a region located below and close to the exhaust gas passage. Therefore, the secondary air passage can be communicated easily with the exhaust gas passage at a point near the combustion chamber of the engine. This enables the secondary air to be supplied to the highest-temperature point of the exhaust gas passage to improve the re-burning efficiency of the unburned gas in the exhaust passage.

Preferably, the outer peripheral surface of the cylinder head may include a first side surface on which an exhaust gas outlet of the exhaust gas passage is opened and a second side surface in a direction substantially perpendicular to the first surface, and a secondary air lead valve may be mounted on the second surface, and be fluidly connected with an upstream end of the secondary air passage.

With this configuration, in the case where the engine is mounted on a vehicle such that the exhaust gas outlet and the intake air inlet are formed on front and rear surfaces in the vehicle traveling direction, the secondary air lead valves are attached to right and left sidewall surfaces of the cylinder head, which allows the compact size of the engine to be realized in a forward and rearward direction. Additionally, the secondary air lead valve can be easily detached from the right and left sides of the vehicle.

Preferably, the exhaust gas passage may be divided into two exhaust gas branch passages by means of a partition, the secondary air passage may include an air passage portion which extends from the groove geometry of the passage portion located under the exhaust gas passage through inside the partition, and is divided into two air branch passage portions, and the two air branch passage portions may be connected with the two exhaust gas branch passages respectively.

With this configuration, in the engine which includes the pair of exhaust valves in one cylinder, the secondary air passage can be communicated easily with each branch exhaust gas passage close to the combustion chamber.

Preferably, the groove geometry of passage portion may be formed with a groove formed on the matching surface of the cylinder head.

With this configuration, the secondary air passage can be formed only by casting and machining (hole making) the cylinder head, and it is not necessary to machine the cylinder.

According to the present invention, preferably, the groove geometry of the passage portion may be formed with both a groove formed on the matching surface of the cylinder head and a groove formed on the matching surface of the cylinder.

With this configuration, a sectional shape of the secondary air passage can widely be formed in the desired shape.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE INVENTION

Figure 1:
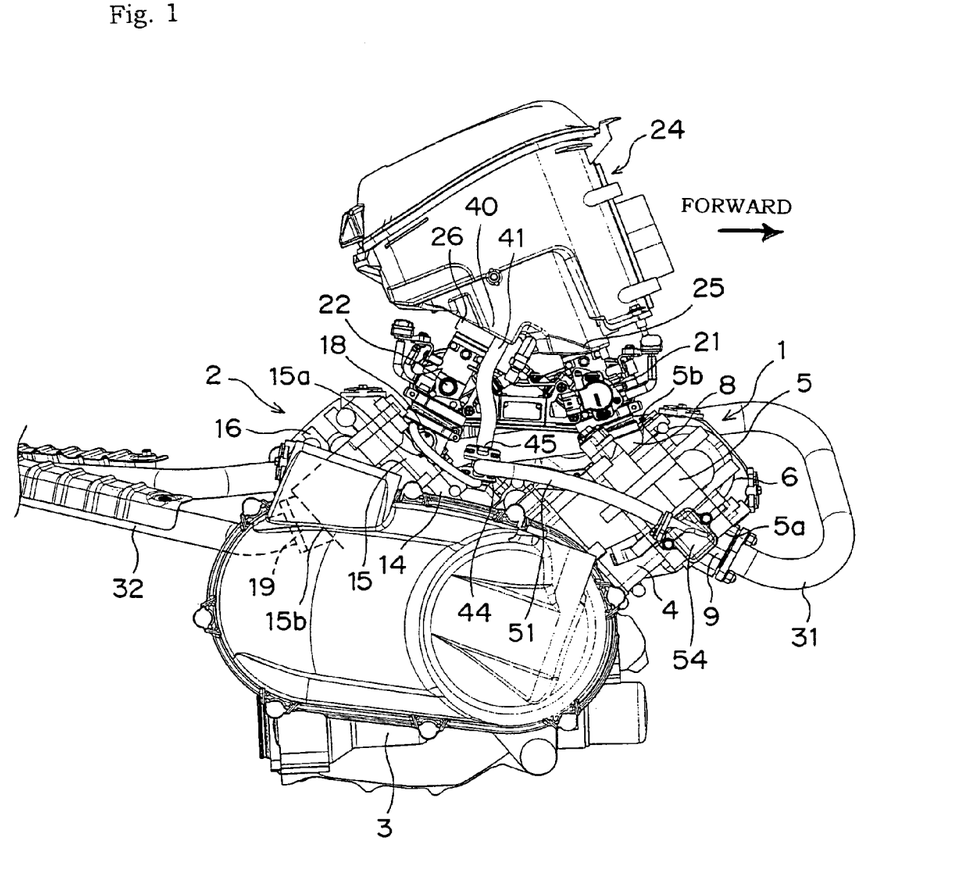
FIG. 1 is a right side view showing a V-2 cylinder engine including a secondary air supply apparatus according to an embodiment of the present invention.
Figure 2:
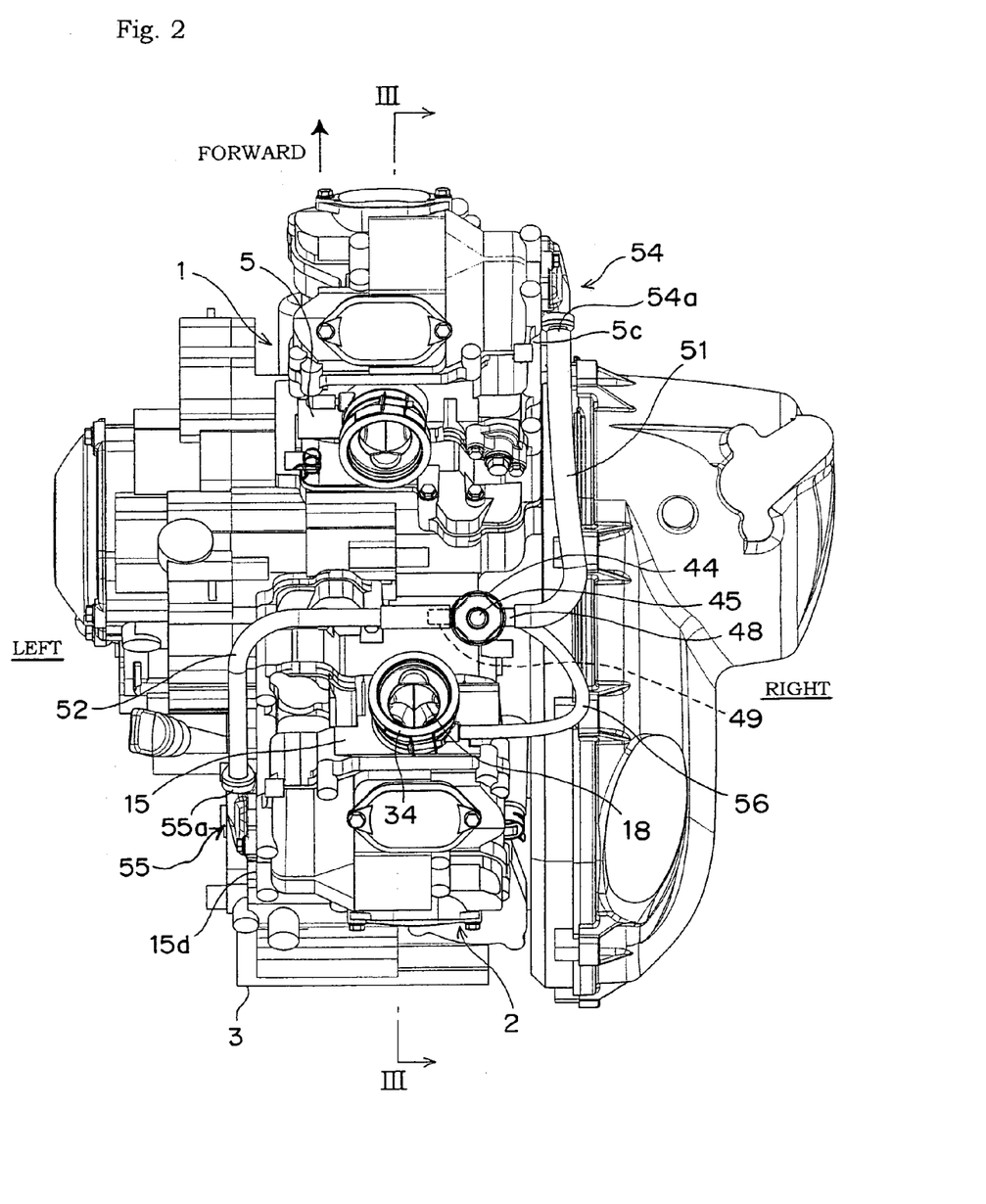
FIG. 2 is a plan view showing the V-2 cylinder engine of FIG. 1.
Figure 3:
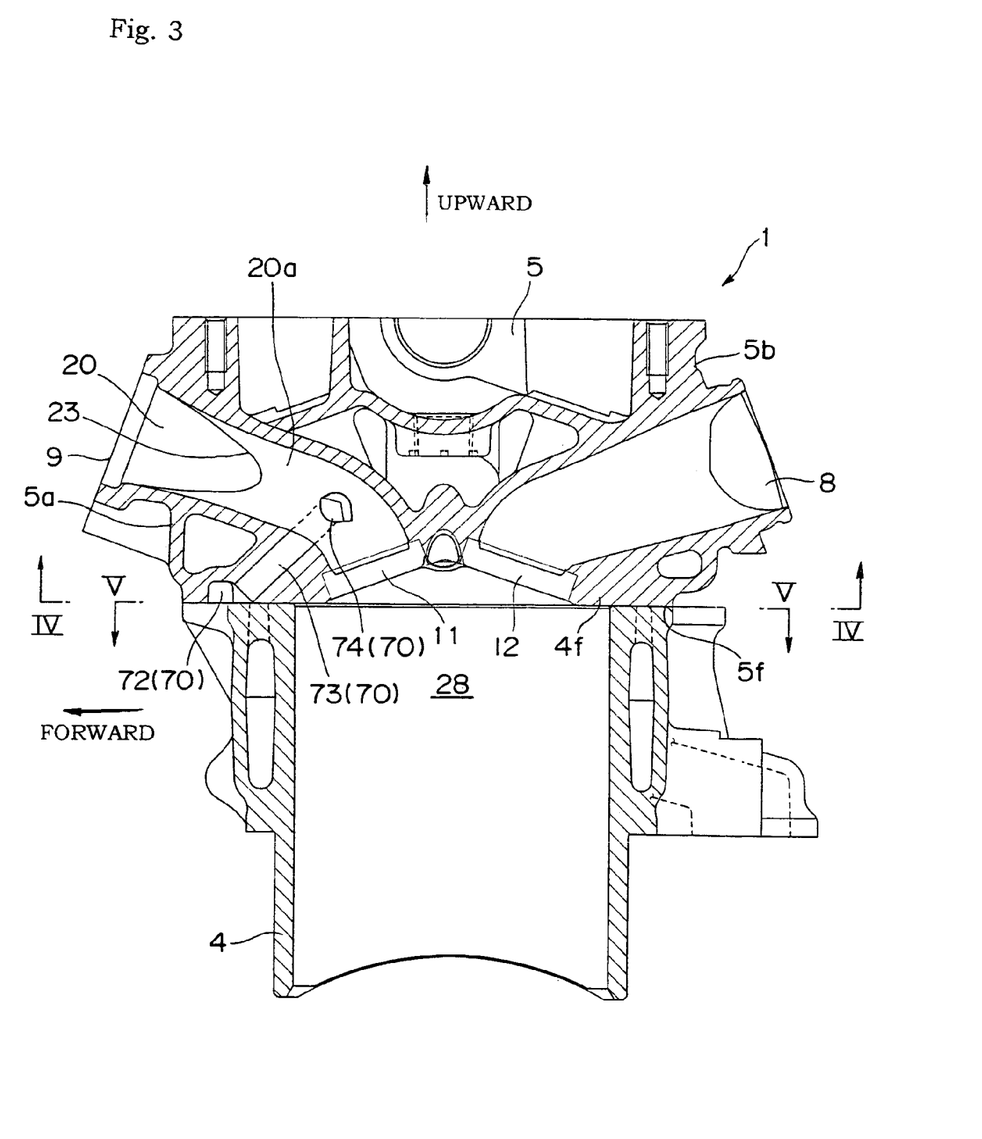
FIG. 3 shows a sectional view taken along a line III-III of FIG. 2 of a front cylinder in the V-2 cylinder engine of FIG. 1.
Figure 4:
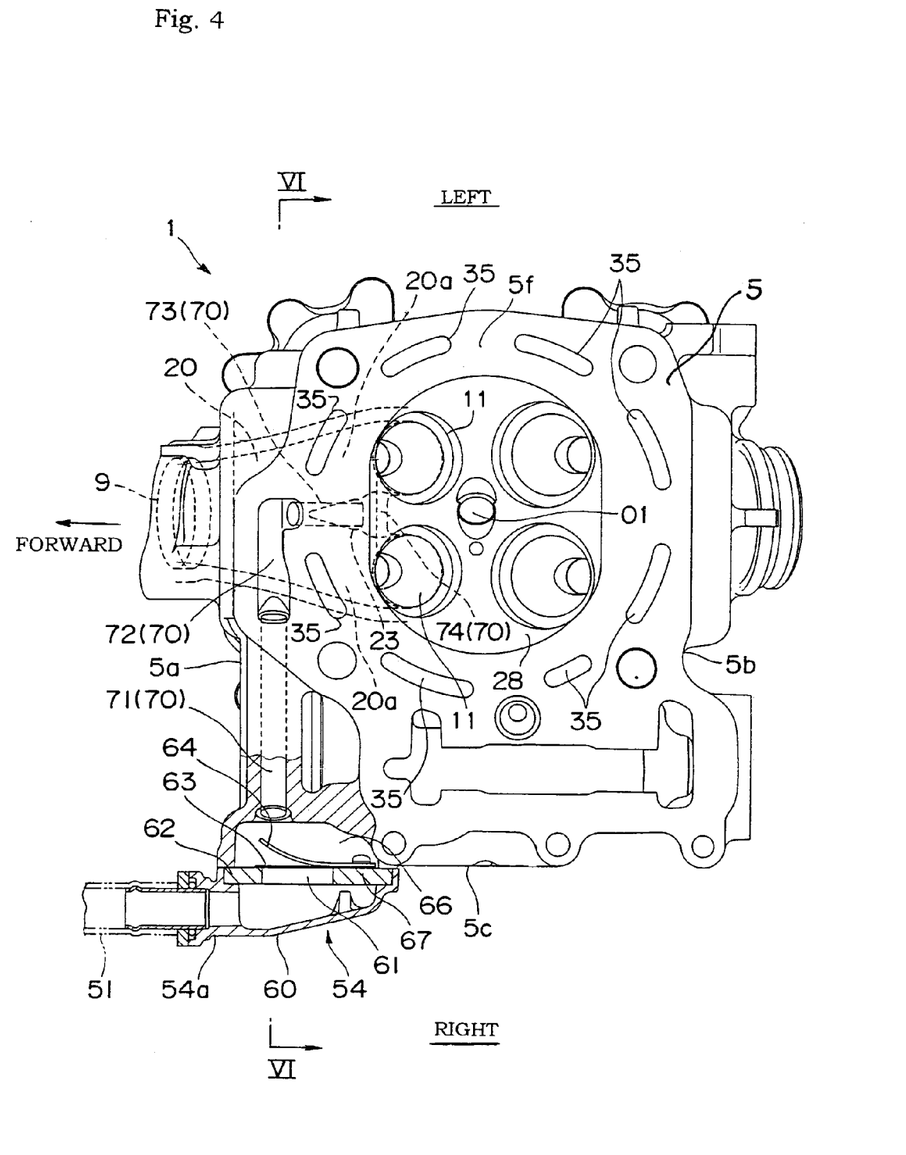
FIG. 4 shows a partially cut out sectional view (bottom view of a cylinder head of the forward cylinder) taken along a line IV-IV of FIG. 3.
Figure 5:
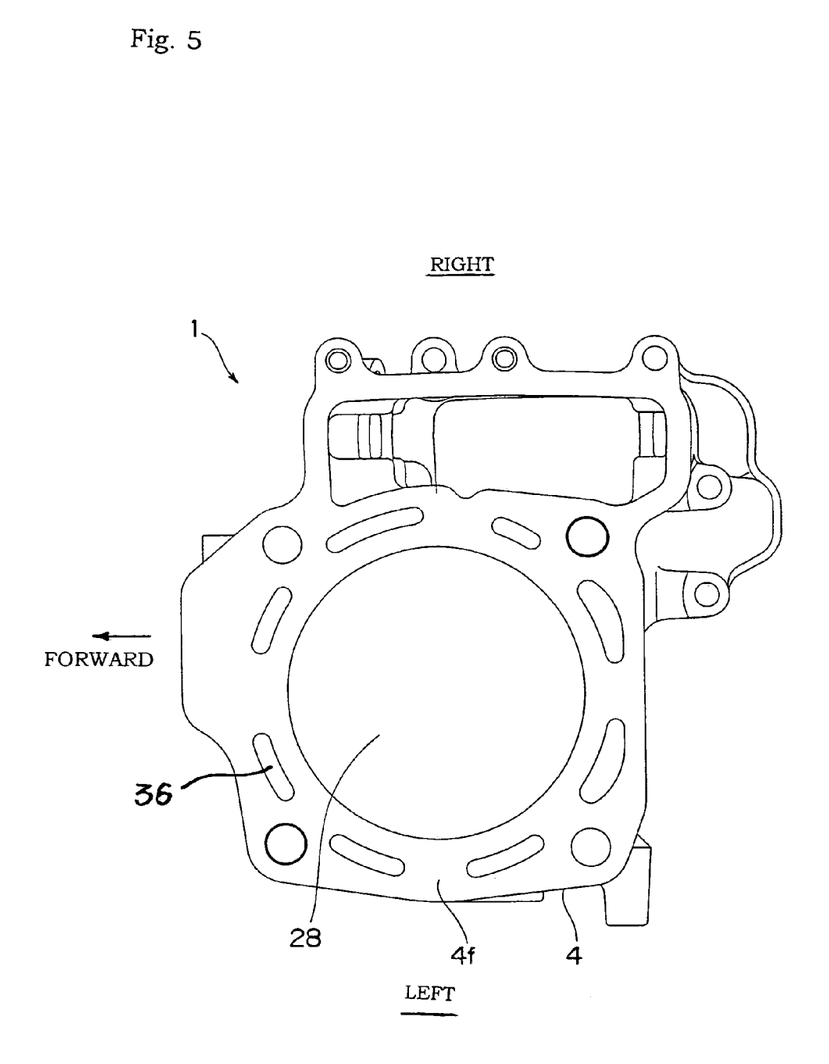
FIG. 5 shows a sectional view (top view of a cylinder body of the forward cylinder) taken along a line V-V of FIG. 3.
Figure 6:
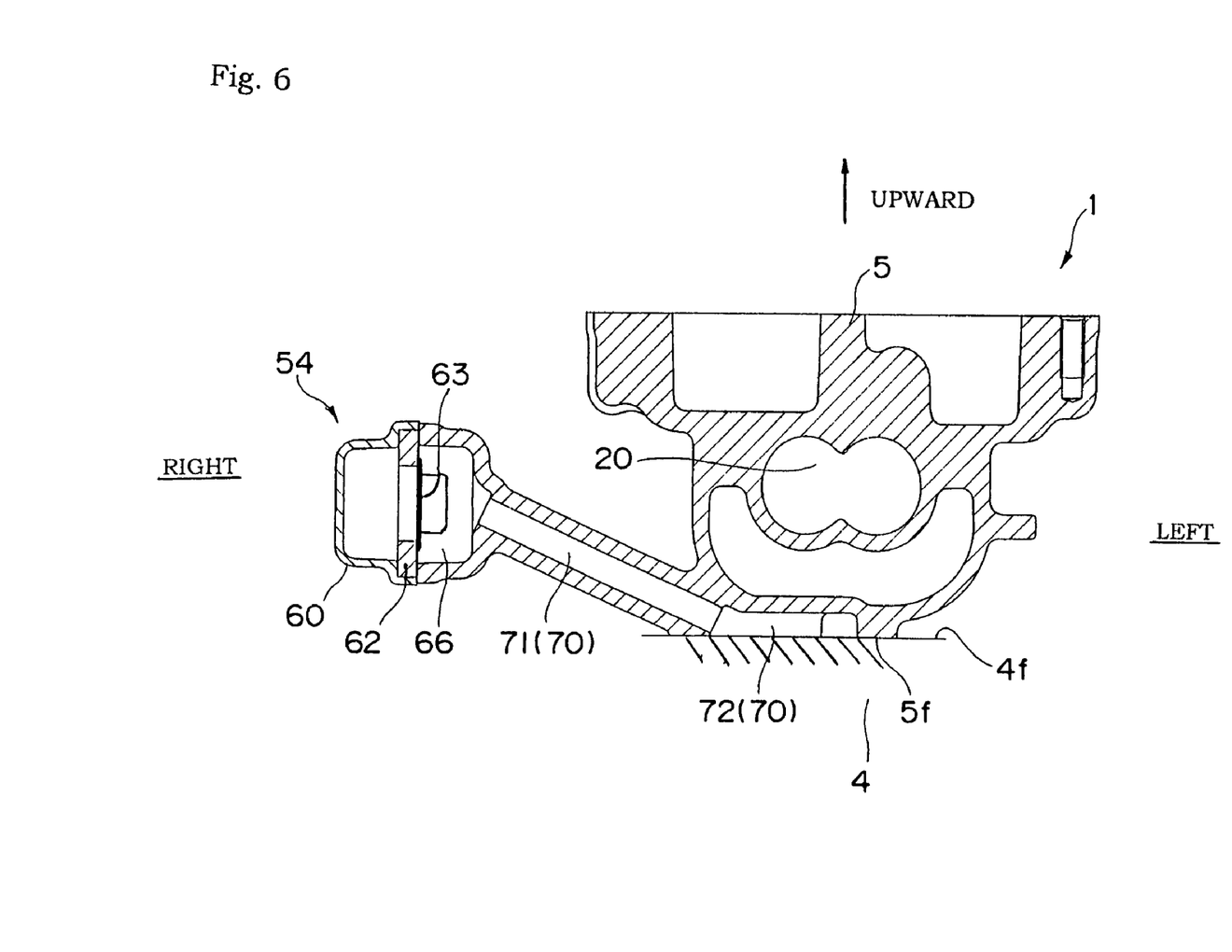
FIG. 6 shows a sectional view taken along a line VI-VI of FIG. 4.
Figure 7:
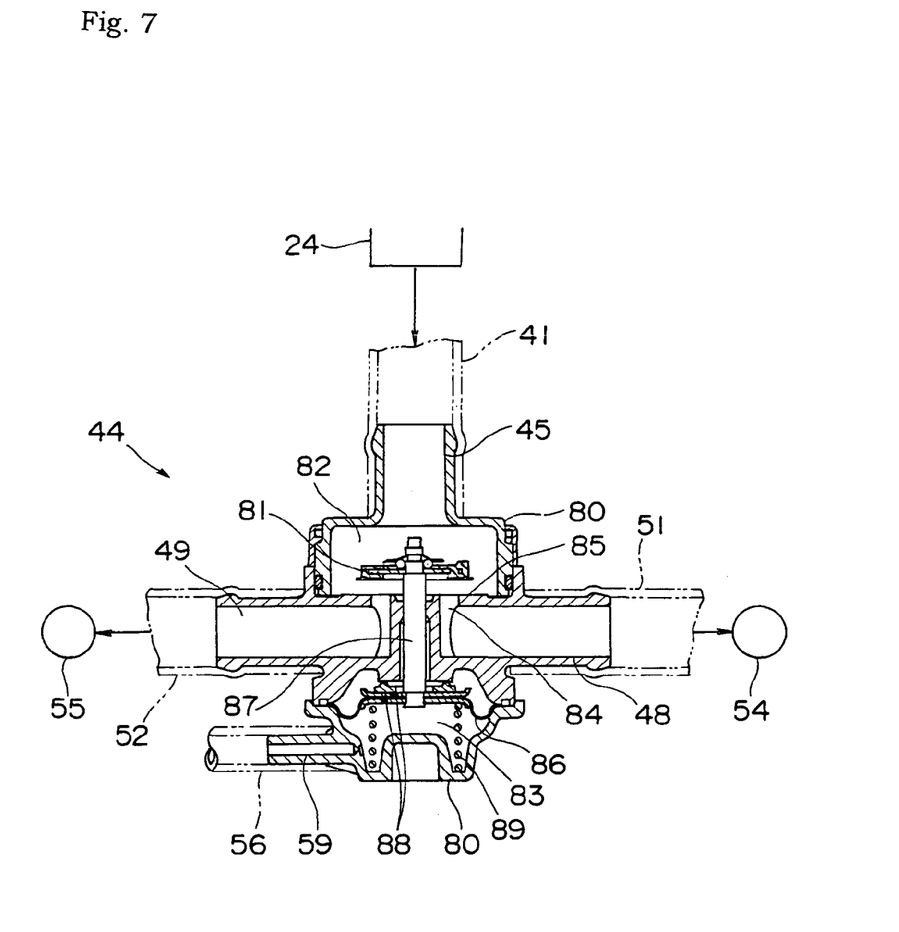
FIG. 7 shows an enlarged longitudinal sectional view of a secondary air on-off valve of the engine of FIG. 4.

FIGS. 1 to 7 show a V-2 cylinder engine for vehicle according to an embodiment of the present invention, and the V-2 cylinder engine is mainly mounted on a four-wheeled all terrain vehicle (A.T.V.). FIG. 1 is a right side view showing the V-2 cylinder engine, FIG. 2 is a plan view showing the V-2 cylinder engine of FIG. 1, FIG. 3 is an enlarged sectional view taken along a line III-III of a front cylinder 1 of FIG. 2 when viewed from the left side, FIG. 4 is a partially cut out sectional view (bottom view of a cylinder head 5) taken along a line IV-IV of FIG. 3, FIG. 5 is a sectional view (top view of a cylinder body 4) taken along FIG. 6 is a sectioned view taken along a line VI-VI of FIG. 4, and FIG. 7 is an enlarged longitudinal sectional view of a secondary air on-off valve 44. An axial direction of a crankshaft of the engine is set to a right and left direction of the engine, a direction perpendicular to the axial direction is set to a forward and rearward direction.

[Entire Structure of Engine]

Referring to FIG. 1, a front cylinder 1 bent forward and a rear cylinder 2 bent rearward are fastened to an upper end of a forward portion of a crank case 3. Both cylinders 1, 2 are arranged in V-shape when viewed from a lateral direction. Each of the cylinders 1 and 2 includes cylinder bodies 4 and 14 coupled to the upper end portion of the crank case 3 with bolts, cylinder heads 5 and 15 fastened to the upper ends of the cylinder bodies 4 and 14 with cylinder fastening bolts, and head covers 6 and 16 and the like coupled to the upper end of the cylinder heads 5 and 15 with bolts, respectively. Intake air inlets 8 and 18 are formed in a rear wall surface 5b of the cylinder head 5 of the front cylinder 1 and a front wall surface 15a of the cylinder head 15 of the rear cylinder 2 respectively. Intake air outlets of front and rear throttle devices 21 and 22 are connected to the intake air inlets 8 and 18 of the cylinder heads 5 and 15 respectively. Intake air inlets of the throttle devices 21 and 22 are connected to front and rear cleaner outlets 25 and 26 in a bottom wall of an air cleaner 24 disposed above the throttle devices 21 and 22, respectively.

Exhaust gas outlets 9 and 19 are formed in a front wall surface 5a (a first side surface) of the cylinder head 5 of the front cylinder 1 and a rear wall surface 15b (a first side surface) of the cylinder head 15 of the rear cylinder 2 respectively. Exhaust gas pipes 31 and 32 are connected to the exhaust gas outlets 9 and 19 respectively, and the exhaust gas pipes 31 and 32 are extended rearward and connected to an exhaust muffler (not shown).

Referring to FIG. 3, a matching surface 5f located at the lower end of the cylinder head 5 is overlapped with a matching surface 4f located at the upper end of the cylinder 4, and the cylinder head 5 is fastened to the cylinder 4 with the bolts as described above. Referring to FIG. 4, an exhaust gas passage 20 formed in the cylinder head 5 of the front cylinder 1 is extended toward a cylinder center O1 from the exhaust gas outlet 9 formed in the front lower wall surface 5a of the cylinder head 5, and the exhaust gas passage 20 is branched at a midpoint into right and left branch exhaust gas passages 20a and 20a by a partition 23. The branch exhaust gas passages 20a and 20a are extended toward a pair of exhaust ports 11 and 11 opened to a combustion chamber 28, and the branch exhaust gas passages 20a and 20a are in communication with the exhaust ports 11 and 11 respectively. Plural cooling water jackets 35 are formed around the combustion chamber 28. Although not shown, the exhaust gas passage of the rear cylinder 2 of FIG. 2 has the structure similar to the exhaust gas passage of the front cylinder 1 except that the fore-and-aft direction is reversely formed.

(Configuration of Secondary Air Supply Apparatus)

Referring to FIG. 1, similarly to the cleaner outlets 25 and 26 for the intake air, a secondary air outlet 40 is in communication with a clean side space of the air cleaner 24 is formed in the bottom wall of the air cleaner 24, and a secondary air source pipe 41 extended substantially downward is connected to the secondary air outlet 40. A secondary air on-off valve 44 is disposed near a bottom of a V-bank formed between the front and rear cylinders 1 and 2, and a lower end portion of the secondary air source pipe 41 is connected to a secondary air inlet 45 formed at an upper end of the secondary air on-off valve 44.

Referring to FIG. 2, the secondary air on-off valve 44 is disposed near a right end portion of the bottom of the V-bank, a secondary air outlet 48 for supplying the second air into the front cylinder 1 is formed at the end on the right side of the secondary air on-off valve 44, a secondary air outlet 49 for supplying the second air into the rear cylinder 2 is formed at the end on the left side of the secondary air on-off valve 44, and a secondary air pipe 51 for supplying the second air into the front cylinder 1 and a secondary air pipe 52 for supplying the second air into the rear cylinder 2 are connected to the secondary air outlets 48 and 49 respectively. The secondary air pipe 51 for supplying the second air into the front cylinder 1 is extended along a right side face of the front cylinder 1, and the secondary air pipe 51 is connected to an inlet 54a of the lead valve 54 for the front cylinder 1 attached to a right sidewall surface 5c of the cylinder head 5 of the front cylinder 1. On the other hand, the secondary air pipe 52 transverses leftward the bottom of the V-bank, and is extended rearward along a left side face of the rear cylinder 2, and the secondary air pipe 52 is connected to an inlet 55a of a lead valve 55 for the rear cylinder 2 attached to a left sidewall surface 15d of the cylinder head 15 of the rear cylinder 2. A negative-pressure supply pipe 56 is connected to a lower end of the secondary air on-off valve 44, the negative-pressure supply pipe 56 is extended toward the intake air inlet 18 of the rear cylinder 2, and is connected to an intake air negative-pressure generation portion in the intake air inlet 18.

Referring to FIG. 4, a secondary air entrance chamber 66 is formed in a front end portion of a right sidewall surface (a second side surface) 5c of the cylinder head 5 of the front cylinder 1, and the lead valve 54 for the front cylinder is attached to the position corresponding to the secondary air entrance chamber 66 with the bolts. The lead valve 54 for the front cylinder includes a valve case 60, a valve support 62 having a valve hole 61, a flexible thin-plate valve body (lead) 63 made of stainless steel or a resin, and a guide 64 which regulates the maximum opening of the valve body 63. The valve body 63 is disposed such that the valve hole 61 is covered therewith from the left side. A rear end portion of the valve body 63 is fixed to the valve support 62 with a screw 67. The valve body 63 is pressed and opened leftward by a difference in pressure between the inside of the valve case 60 and the secondary air entrance chamber 66 (pressure inside the valve case>pressure in the secondary air chamber), which causes the secondary air to flow only from the inside of the valve case 60 into the secondary air entrance chamber 66. The rear end portion of the guide 64 is fixed to the valve support 62 along with the valve body 63, the guide 64 is inclined toward a left forward direction with respect to the valve support 62 to restrict the opening of the valve body 63 within a predetermined opening.

In the cylinder head 5 of the front cylinder 1, a secondary air passage 70 is formed from the secondary air entrance chamber 66 to the right and left branch exhaust gas passages 20a and 20a. The secondary air passage 70 includes a first passage portion 71, a second passage portion 72, a third passage portion 73, and a fourth passage portion 74. As shown in FIG. 6, the first passage portion 71 is linearly extended toward the left downward direction from the secondary air entrance chamber 66, and reaches a matching surface 5f at the lower end of the cylinder head 5. The second passage portion 72 is extended leftward from the left end portion of the first passage portion 71 to the region in the neighborhood below the exhaust gas passage 20. As shown in FIG. 3, the third passage portion 73 is extended toward the rear upward direction from the left end portion of the second passage portion 72 to the inside of the partition 23. The fourth passage portion 74 is branched into right and left from the rear upper end portion of the third passage portion 73, and is opened to the side face of each branch exhaust gas passage 20a.

Referring to FIG. 6, the second passage portion 72 of the secondary air passage 70 includes a groove formed in the matching surface 5f located at the lower end of the cylinder head 5, and the second passage portion 72 is molded during the casting or die-casting of the cylinder head 5. On the other hand, the first passage portion 71 is formed in a so-called drill hole which is made using the drill after the casting or die-casting of the cylinder head 5. Referring to FIG. 3, the third passage portion 73 is a so-called drill hole which is made using the drill after the casting of the cylinder head 5 like the first passage portion 71. The fourth passage portion 74 is molded during the casting of the cylinder head 5.

Referring to FIG. 5, in this embodiment, the cooling water jacket 36 is opened on the matching surface 4f located at the upper end of the cylinder 4, whereas a passage portion for secondary air is not formed.

Although not shown, the secondary air passage having the structure similar to that of the front cylinder 1 is formed in the cylinder head 15 of the rear cylinder 2 of FIG. 1. However, in the secondary air passage of the rear cylinder 2, the right and left and the front and rear are inversely formed compared with the secondary air passage of the front cylinder 1.

(Secondary Air On-Off Valve)

Referring to FIG. 7, usually the secondary air on-off valve 44 is referred to as air cut valve, a secondary air inlet 45 formed at the upper end of the secondary air on-off valve 44 is formed in a cylindrical shape projected upward, a negative-pressure inlet port 59 formed at the lower end of the secondary air on-off valve 44 is formed in a cylindrical shape projected leftward, the secondary air outlet 48 for the front cylinder 1 formed at the right end of the secondary air on-off valve 44 is formed in a cylindrical shape projected rightward, and the secondary air outlet 49 for the rear cylinder 2 formed at the left end of the secondary air on-off valve 44 is formed in a cylindrical shape projected leftward. A valve chamber 82 is formed in an upper portion of a valve case 80, and a negative-pressure actuating chamber 83 is formed in a lower portion of the valve case 80. The valve chamber 82 is communicated with the secondary air inlet 45 while accommodating a valve body 81. The negative-pressure actuating chamber 83 is communicated with the negative-pressure inlet port 59. The valve chamber 82 is communicated with the right and left secondary air outlets 49 and 48 through the valve hole 84, and the valve chamber 82 includes a valve seat 85. The valve body 81 is seated on the valve seat 85 to cut off between the valve chamber 82 and both the secondary air outlets 48 and 49, thereby closing the secondary air on-off valve 44. An upper side of the negative-pressure actuating chamber 83 is covered with a flexible rubber diaphragm 86, and the diaphragm 86 is biased upward by a valve spring 89 while fixed to a lower end portion of a connecting rod 87 by a pair of clamping plates 88. The connecting rod 87 is extended upward, and the valve body 81 is fixed to the upper end portion of the connecting rod 87. That is, when the negative pressure is not supplied to the negative-pressure actuating chamber 83 or when the negative pressure is lowered, the diaphragm 86 and the valve body 81 is moved upward by the valve spring 89 to keep the valve hole 84 opened. On the contrary, when at least a predetermined amount or more of negative pressure is supplied to the negative-pressure actuating chamber 83, the negative pressure bends downward the diaphragm 86 against the valve spring 89, which lowers the valve body 81 against the connecting rod 87 to close the valve hole 84.

(Secondary Air Flow)

(1) Referring to FIGS. 1 and 2, when the negative pressure of the negative-pressure generating portion of the intake air inlet 18 of the cylinder head 15 is zero or lower than a predetermined value like the case in which the engine is stopped or idled, the secondary air on-off valve 44 is opened as shown in FIG. 7. Accordingly, part of the air in the clean side space of the air cleaner 24 passes through the secondary air on-off valve 44 from the secondary air source pipe 41, and the part of the air is distributed as the secondary air to the right and left secondary air supply pipes 52 and 51. The secondary air distributed to the secondary air supply pipe 51 for the front cylinder is supplied to the lead valve 54 for the front cylinder, and the secondary air distributed to the secondary air supply pipe 52 for the rear cylinder is supplied to the lead valve 55 of the rear cylinder 2.

(2) Referring to FIG. 4, the secondary air supplied to the valve case 60 of the lead valve 54 for the front cylinder presses and opens the valve body 63 to flow into the secondary air entrance chamber 66, the secondary air flows leftward through the first and second passage portions 71 and 72 of the secondary air passage 70 to reach an under-position of the exhaust gas passage 20. Then, the secondary air flows in the third passage portion 73 from the left end portion of the second passage portion 72 toward the rear upward direction, enters the partition 23 of the branch exhaust gas passages 20*a* and 20*a* to reach the neighborhood of the downstream end portion of the exhaust gas, i.e., the neighborhood of the exhaust port 11. Then, the secondary air is branched into right and left in the fourth passage portion 74, and is supplied to the right and left branch exhaust gas passages 20*a* and 20*a* and used to re-burn the unburned gas.

In the rear cylinder 2 of FIG. 1, basically similarly to the front cylinder 1, the secondary air is supplied to the neighborhood in the downstream end portion of the exhaust gas of the right and left branch exhaust gas passages through the secondary air passage.

When the throttle devices 21 and 22 are closed while the engine runs in a high revolving speed range, because the intake air negative pressure is increased, the secondary air on-off valve 44 is closed (air cut off state). When the revolving speed of the engine is decreased, the intake air negative pressure is lowered to open the secondary air on-off valve (air flowing state).

Effects of Embodiment

According to the present embodiment, referring to FIG. 4, in the first to fourth passage portions 71 to 74 constituting the secondary air passage 70, because the second passage portion 72 is formed in the groove shape on the matching surface 5*f* of the cylinder head 5 with the cylinder body 4, the second passage member 72 can simultaneously be molded during the casting of the cylinder head 5.

The second passage portion 72 is formed in the groove shape in the matching surface 5*f* of the cylinder head 5 with the cylinder body 4. Therefore, compared with the conventional example in which the whole of the secondary air passage is substantially formed by the drill hole, the degrees of freedom of the shape and layout design are increased in the secondary air passage 70, the external piping is decreased, the secondary air passage 70 can be easily formed in the layout in which the cooling water jacket 35 is avoided without enlarging the cylinder head 5.

The second passage portion 72 is formed in the groove shape in the matching surface 5*f* of the cylinder head 5 with the cylinder body 4. Therefore, compared with the conventional example in which the whole of the secondary air passage is substantially formed by the drill hole, the first and fourth passage portions 71 and 74 made by the drilling can be shortened, the drill is prevented to break or bent during the hole making work because the short drill can be used, and the hole making work becomes easy in the first and fourth passage portions 71 and 74.

The groove-shaped second passage portion 72 is formed on the matching surface 5*f* of the cylinder head 5 with the cylinder body 4. Therefore, the secondary air passage 70 can easily be guided to the region in the neighborhood below the exhaust gas passage 20, and can be guided from the region in the neighborhood below the exhaust gas passage 20 to the point near the combustion chamber of the branch exhaust gas passages 20*a* and 20*a* by the short third passage portion 73. Accordingly, while the compact cylinder head 5 is maintained, the secondary air can be supplied to a high-temperature region of the exhaust gas passage 20 to improve the re-burning efficiency of the unburned gas.

Referring to FIG. 2, the lead valves 54 and 55 for the front and rear cylinders are attached to the right and left sidewall surfaces 5*c* and 15*d* of the cylinder heads 5 and 15 respectively. Therefore, the size in the fore-and-aft direction and the height of the engine can be decreased in the fore-and-aft direction of the engine, and the lead valves 54 and 55 can easily detachably be attached from the right and left sides of the vehicle.

Referring to FIG. 4, in the engine which includes the pair of exhaust valves (exhaust port 11) in one cylinder, the third passage portion 73 is formed in the partition 23 between the branch exhaust gas passages 20*a* and 20*a*, so that the secondary air passage 70 can easily be opened in the branch exhaust gas passages 20a and 20a at the point near the combustion chamber 28.

Figure 8:
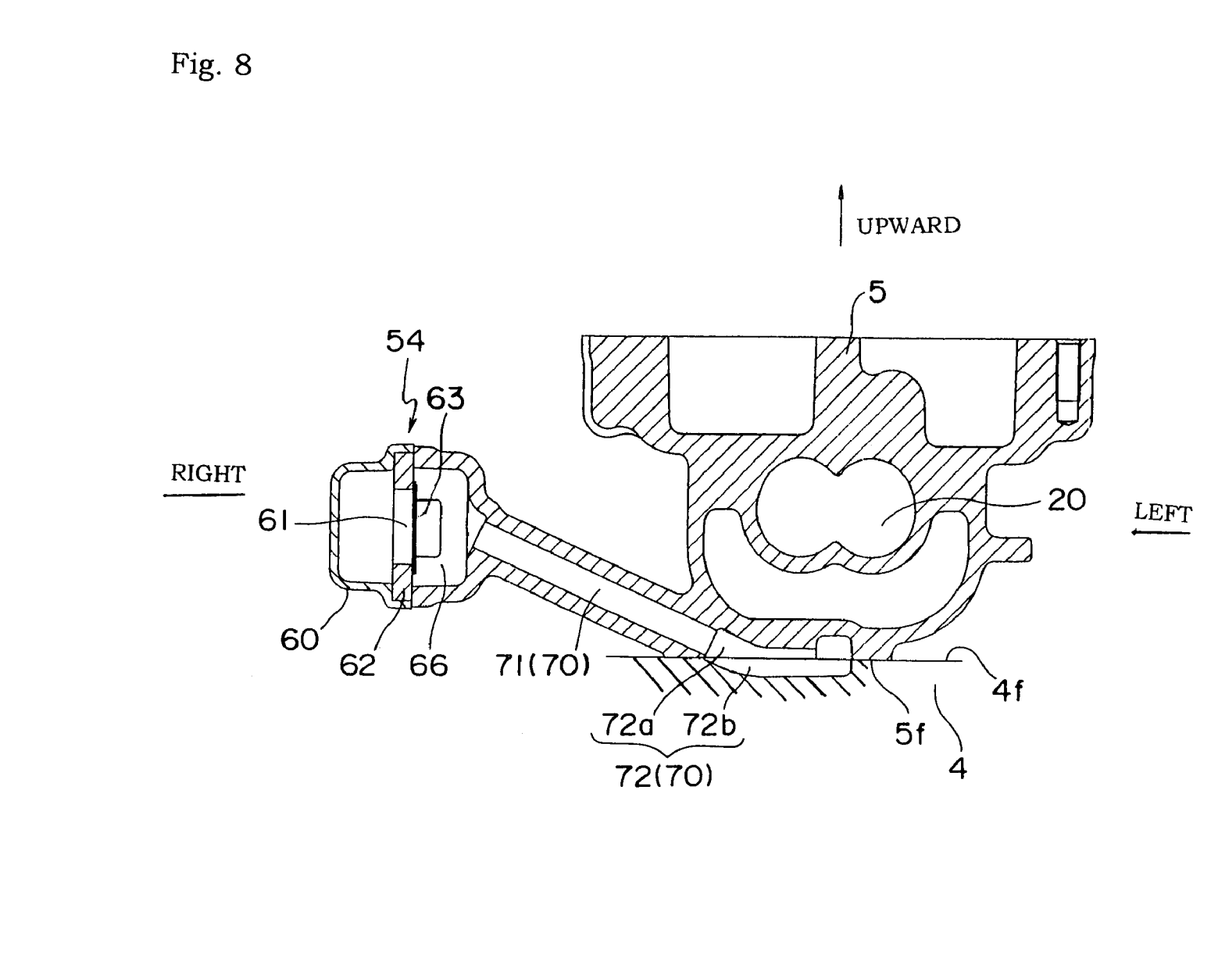
FIG. 8 is a sectional view of the same portion as that of FIG. 6 showing a modification of the secondary air passage.

Other Embodiments (1) FIG. 8 shows a modification of the secondary air passage 70 in the cylinder head 5. The second passage portion 72 includes a groove portion 72a and a groove portion 72b. The groove portion 72a is formed on the matching surface 5f located at the lower end of the cylinder head 5, and the groove portion 72b is formed on the matching surface 4f located at the upper end of the cylinder body 4.

(2) In FIG. 8, the second passage portion 72 of the secondary air passage 70 may be formed only by the groove portion 72b which is formed in the matching surface 4f located at the upper end of the cylinder body 4.

(3) The engine of the embodiment mentioned above is a four-valve engine including the pair of intake valves and the pair of exhaust valves in the one cylinder. Alternatively, the invention can also be applied to the engine which includes a single exhaust valve in the one cylinder.

(4) It is to be understood that the invention should not be limited to the structure in the above-described preferred embodiments, and therefore, that various modifications can be applied within the scope of claims.

What is claimed is:

1. An engine comprising:
    a cylinder head having an exhaust gas passage, a lower end, an outer peripheral surface, an air entrance on the outer peripheral surface, and a matching surface disposed at the lower end of the cylinder head between the cylinder head and a cylinder body; and
    a secondary air supply apparatus for supplying secondary air into the exhaust gas passage in the cylinder head, the secondary air supply apparatus including a secondary air passage, the secondary air passage including a first passage portion, a second passage portion, a third passage portion and a fourth passage portion, the first passage portion linearly extending from the air entrance on the outer peripheral surface of the cylinder head to the matching surface at the lower end of the cylinder head, the second passage portion comprising a groove extending along the matching surface, and extending from a downstream end of the first passage portion to a region below the exhaust gas passage, the third passage portion extending upwardly from a downstream end of the second passage portion, and the fourth passage portion extending from a downstream end of the third passage portion to the exhaust gas passage.

2. The engine as claimed in claim 1, wherein the outer peripheral surface of the cylinder head includes a first side surface on which an exhaust gas outlet of the exhaust gas passage is opened and a second side surface in a direction substantially perpendicular to the first surface, and
    a secondary air lead valve is mounted on the second side surface, and is fluidly connected with an upstream end of the secondary air passage.

3. The engine as claimed in claim 2, wherein the exhaust gas passage is divided into first and second exhaust gas branch passages by means of a partition,
    the fourth passage portion is divided into first and second air branch passage portions, and
    the first and second air branch passage portions are connected with the first and second exhaust gas branch passages, respectively.

4. The engine as claimed in claim 1, wherein the groove is formed from both a groove formed on the matching surface of the cylinder head and a groove formed on a matching surface of the cylinder body.

* * * * *